US010645378B2

(12) United States Patent
Hendrickson et al.

(10) Patent No.: US 10,645,378 B2
(45) Date of Patent: May 5, 2020

(54) FOCAL PLANE ILLUMINATOR FOR GENERALIZED PHOTON TRANSFER CHARACTERIZATION OF IMAGE SENSOR

(71) Applicant: United States of America, as represented by the Secretary of the Navy, Patuxent River, MD (US)

(72) Inventors: Aaron Hendrickson, Lexington Park, MD (US); Gary Lohman, Great Mills, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 147 days.

(21) Appl. No.: 16/025,406

(22) Filed: Jul. 2, 2018

(65) Prior Publication Data
US 2020/0007858 A1    Jan. 2, 2020

(51) Int. Cl.
*H04N 17/00*    (2006.01)
*H04N 5/369*    (2011.01)
*H04N 5/357*    (2011.01)
*G02B 26/00*    (2006.01)

(52) U.S. Cl.
CPC .......... *H04N 17/002* (2013.01); *G02B 26/00* (2013.01); *H04N 5/357* (2013.01); *H04N 5/369* (2013.01)

(58) Field of Classification Search
CPC .... H04N 17/002; H04N 5/369; H04N 13/246; H04N 5/357; G02B 26/00
See application file for complete search history.

(56) References Cited

U.S. PATENT DOCUMENTS

| 4,231,663 A * | 11/1980 | Phillippi | G01N 21/274 250/573 |
| 2004/0008267 A1* | 1/2004 | Chen | H04N 5/2351 348/229.1 |
| 2010/0020180 A1* | 1/2010 | Hill | H04N 5/2253 348/188 |
| 2015/0070511 A1* | 3/2015 | Williams | H04N 17/002 348/188 |
| 2018/0372481 A1* | 12/2018 | Stigwall | G01B 21/042 |

\* cited by examiner

*Primary Examiner* — Que Tan Le
*Assistant Examiner* — Jennifer D Bennett
(74) *Attorney, Agent, or Firm* — Olivia Scheuer; NAWCAD

(57) ABSTRACT

A method and apparatus for characterizing a pixel of an image sensor is provided. The apparatus includes a narrowband, temporally incoherent, temporally stable illumination source. The narrowband light source generates a spatially coherent illumination beam. A variable optical attenuator attenuates the illumination beam resulting in an attenuated beam that does not alter the uniformity of the illumination. A focal plane integrator projects, expands, and homogenizes the attenuated beam to illuminate a focal plane of a sensor. Image sequences are collected to generate statistics for characterizing the sensor.

15 Claims, 3 Drawing Sheets

Focal Plane Illuminator Transmission Curve

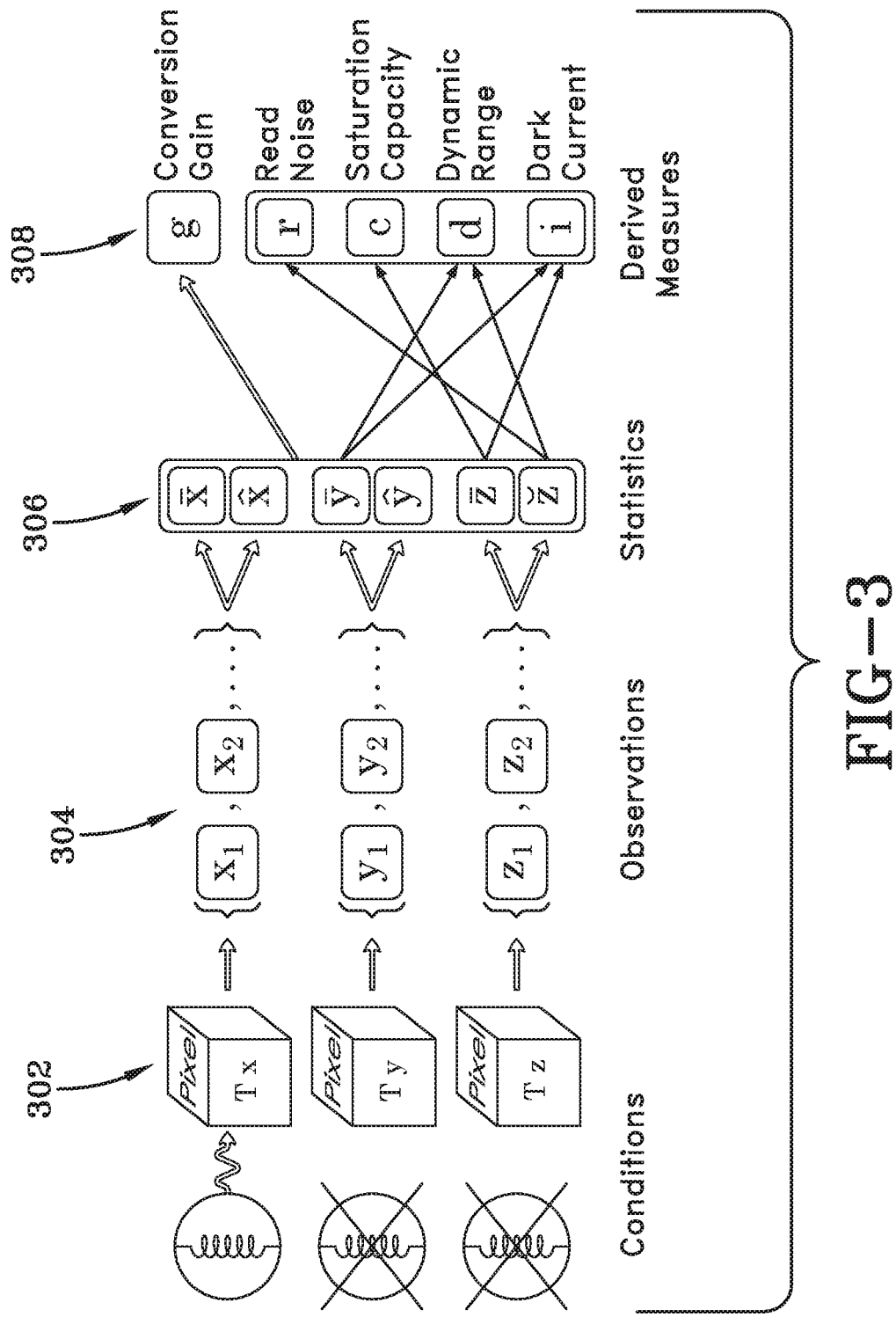

FOCAL PLANE ILLUMINATOR FOR GENERALIZED PHOTON TRANSFER CHARACTERIZATION OF IMAGE SENSOR

STATEMENT OF GOVERNMENT INTEREST

The invention described herein may be manufactured and used by or for the Government of the United States of America for governmental purposes without payment of any royalties thereon or therefore.

BACKGROUND

Sensor characterization is the process of understanding the functionality of the sensor. Sensor characterization includes, but is not limited to, performance metrics such as conversion gain, dynamic range, read noise, dark current, saturation capacity, uniformity, defect pixels, quantum efficiency, modulation transfer function, and timing accuracy. The characterization of electronic image sensors begins with characterizing the photon transfer of a light signal input to an electrical signal output. The traditional photon transfer method compares a camera's output signal and noise across all pixels collectively to determine a conversion gain constant that relates digital grey values to electrons. The method known as photon transfer was developed initially for the characterization of video tube image sensors. The photon transfer method was subsequently applied to a variety of image sensors for the characterization of the transfer of photon signal to digital number output. It was subsequently discovered through both experimentation and theoretical analysis that the underlying assumptions of the traditional photon transfer method rendered the method insufficient for many modern sensors, and that the data products of the traditional photon transfer method lacked detailed information useful for whole sensor characterization.

SUMMARY

In general, in one aspect, an apparatus for individually characterizing pixels of a sensor, the apparatus comprises: a narrowband light source, wherein the narrowband light source generates a spatially coherent illumination beam; a variable optical attenuator, wherein the variable optical attenuator attenuates the spatially coherent illumination beam resulting in an attenuated beam, wherein the spatial uniformity of the attenuated beam is invariant to the attenuation and; a focal plane integrator, wherein the focal plane integrator expands and homogenizes the attenuated beam to illuminate a focal plane of a sensor.

In general, in another aspect, a method for characterizing a pixel of a sensor, the method comprising: generating, by a focal plane illuminator, an illumination beam; attenuating, by the focal plane illuminator, the illumination beam, wherein the illumination beam is attenuated utilizing an optical attenuator; homogenizing, by the focal plane illuminator, the attenuated illumination beam; projecting, by the focal plane illuminator, the homogenized attenuated illumination beam wherein the shape of the projected homogenized attenuated illumination beam is changed to fill a focal plane of a sensor; and collecting, by the focal plane illuminator, one or more image sequences.

Unless otherwise defined, all technical and scientific terms used herein have the same meaning as commonly understood by one of ordinary skill in the art to which this invention belongs. Other features and advantages will be apparent from the following detailed description.

DRAWINGS

These and other features, aspects and advantages of the present invention will become better understood with reference to the following description and appended claims, and accompanying drawings wherein:

FIG. 3 is a table of illumination conditions of generalized photon transfer, in accordance with an embodiment of the present invention.

DETAILED DESCRIPTION

Figure 1:
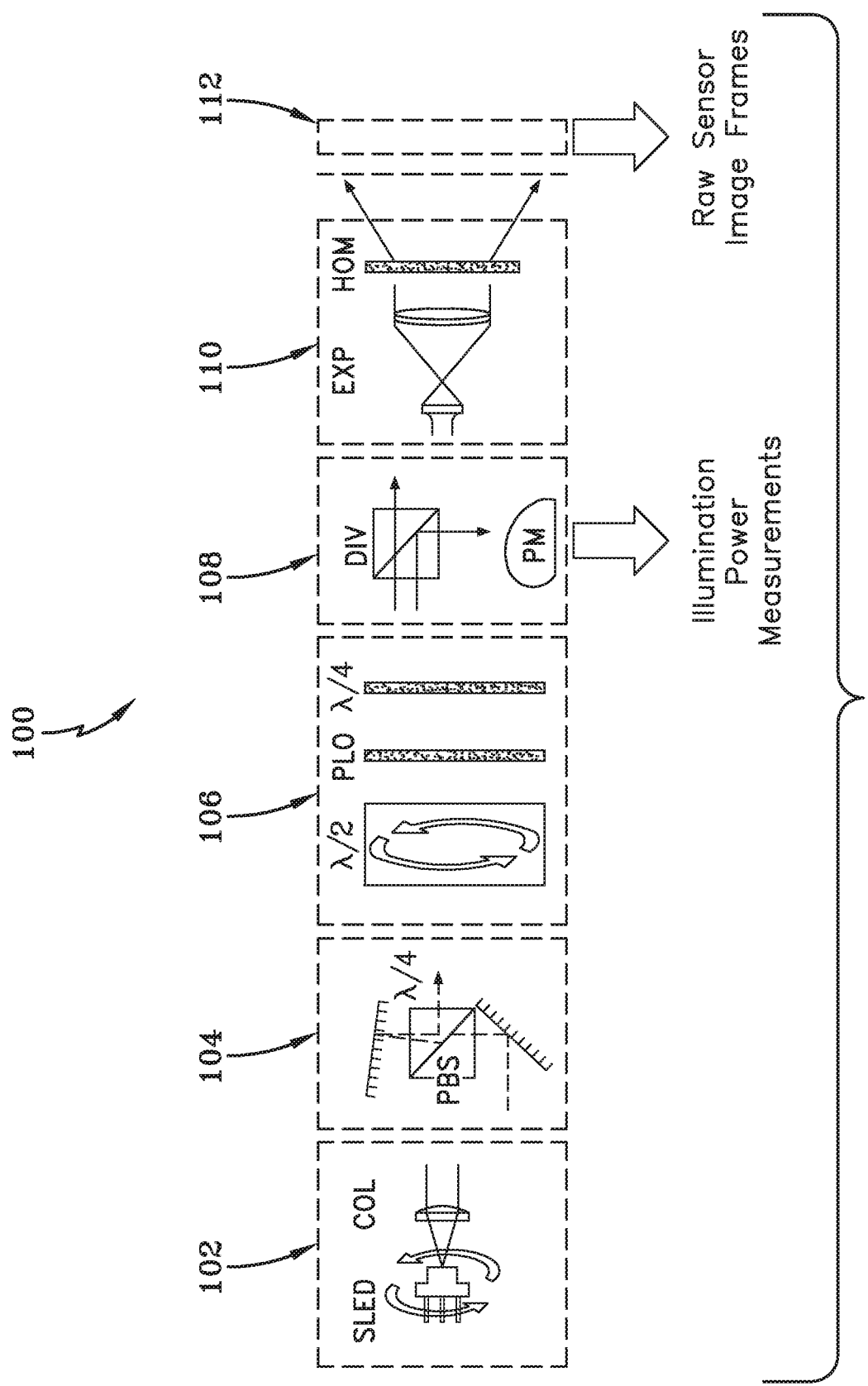
FIG. 1 is a block diagram of a focal plane illuminator system, in accordance with an embodiment of the present invention.

Embodiments of the present invention recognize that existing methods of image sensor characterization, that assume a model of sensor uniformity, do not provide the correct measurements needed to adequately test many modern digital cameras. Existing methods of characterization compare measurements of the photon transfer of a light signal input to an electrical signal output. This method requires two assumptions: (1) the photon signal to electrical signal transfer function is identical for every pixel of a sensor, and (2) other transfer function related metrics such as read noise are also identical across pixels. Where these two assumptions hold true, sensor level scalar measurements of the photon transfer method are sufficient to characterize a uniform sensor comprised of equivalent pixels. However, the first assumption only applies to passive-pixel, single tap devices, where charge from each pixel is read through the same readout circuit. Active pixel and multi-tap sensors, which represent a significant market share of modern cameras, exhibit varying degrees of non-uniformity in pixel-level transfer functions across a sensor; therefore, existing photon transfer methods do not model modern sensors accurately. As a result, these sensors have to be characterized by distributions of the scalar measurements of each pixel.

Embodiments of the present invention recognize a need for an image sensor characterization method that will accurately model a more generalized class of image sensors, including both CCD and CMOS passive and active pixel devices. CCD and CMOS image sensors are commonly utilized in many modern digital cameras, especially high speed cameras. CMOS image sensors enable active pixel sensor (APS) architecture, where each pixel acts as an independent sensing device—each pixel having its own pixel level photon transfer characteristics. APS architecture defies the assumption that photon transfer is functionally identical for every pixel. Embodiments of the present invention utilize an apparatus to characterize image sensors via a method called generalized photon transfer. Generalized photon transfer is a pixel-level, non-uniform photon transfer method for characterizing sensors. Further, generalized photon transfer alleviates the need for photon transfer assumptions by allowing for a non-linear characterization at a pixel level within a sensor. Characterization of sensors can include measurement of conversion gain and related, derived, measures such as read noise, saturation capacity, dynamic range, and dark current.

The generalized photon transfer method requires knowing the relative change in irradiance for each pixel from one illumination level to the next. As a result, spatial uniformity of illumination across the sensor is a convenience, but spatial variation in illumination must be invariant with changes in illumination. As opposed to the traditional photon transfer method, which relied on sampling a statistically significant portion of the sensor's assumed equivalent pixels, generalized photon transfer relies on measuring each pixel. Consequently, the focal plane illumination required for generalized photon transfer must cover the entire sensor area, i.e., every pixel. The generalized photon transfer method utilizes an instrument with specific properties for providing the necessary input for a sensor under test.

While the primary motivation behind the generalized photon transfer method was to characterize active pixel sensor architecture devices, the generalized photon transfer method has also been experimentally verified to provide the same results for sensors possessing the photon transfer assumptions. The generalized photon transfer method can therefore be used to characterize any photo-electrically based image sensor.

Turning now to the figures, FIG. 1 is a block diagram of the focal plane illuminator. In some embodiments, focal plane illuminator 100 is a compact electro-optical instrument used for characterization of an image sensor using generalized photon transfer. In some embodiments, focal plane illuminator 100 interfaces with an arbitrary camera or camera sensor, for example device under test 112, to provide input signals in the plane of the camera sensor for performing generalized photon transfer measurements. In some embodiments, focal plane illuminator 100 is compact, portable, and robust. For example, in some embodiments, focal plane illuminator 100 is packaged to be used by a military fleet, and therefore meets military grade standards.

Focal plane illuminator 100 illuminates the focal plane of a sensor with various levels of temporally uniform illumination ranging from dark to saturation of the pixels. Further, the generalized photon transfer method relies on stacks of raw images to collect multiple data points for each pixel; therefore, the illumination must be temporally invariant. Generally, the focal plane illuminator 100 consists of five components: a narrowband illumination source 102, passive optical isolation component 104, a variable optical attenuator 106, a beam sampling component 108 for power measurements, and a focal plane integrator 110 that expands, shapes, homogenizes, and projects the illumination onto the focal plane of the device under test 112. The data returned that is essential for sensor characterization is (1) the illumination power measurements, and (2) the raw image frames captured from the sensor under test.

Narrowband illumination source 102 provides a narrowband illumination beam of sufficient power to saturate each pixel of device under test 112 in a temporally and spatially stable manner. In some embodiments, narrowband illumination source 102 is a superluminescent diode (SLED). SLEDs offer the advantage of high-power, incoherent, temporally stable, narrowband illumination. Because the SLED's optical output is highly polarized, the SLED is rotatable. This enables the overall dynamic range of the illumination to be adjustable by adjusting the maximum possible illumination level. Narrowband illumination source 102 component also includes a collimating lens so that the light is collimated into a parallel beam. Thus the light is spatially coherent and temporally stable, but temporally incoherent so as to avoid complications from speckle noise.

Figure 2:
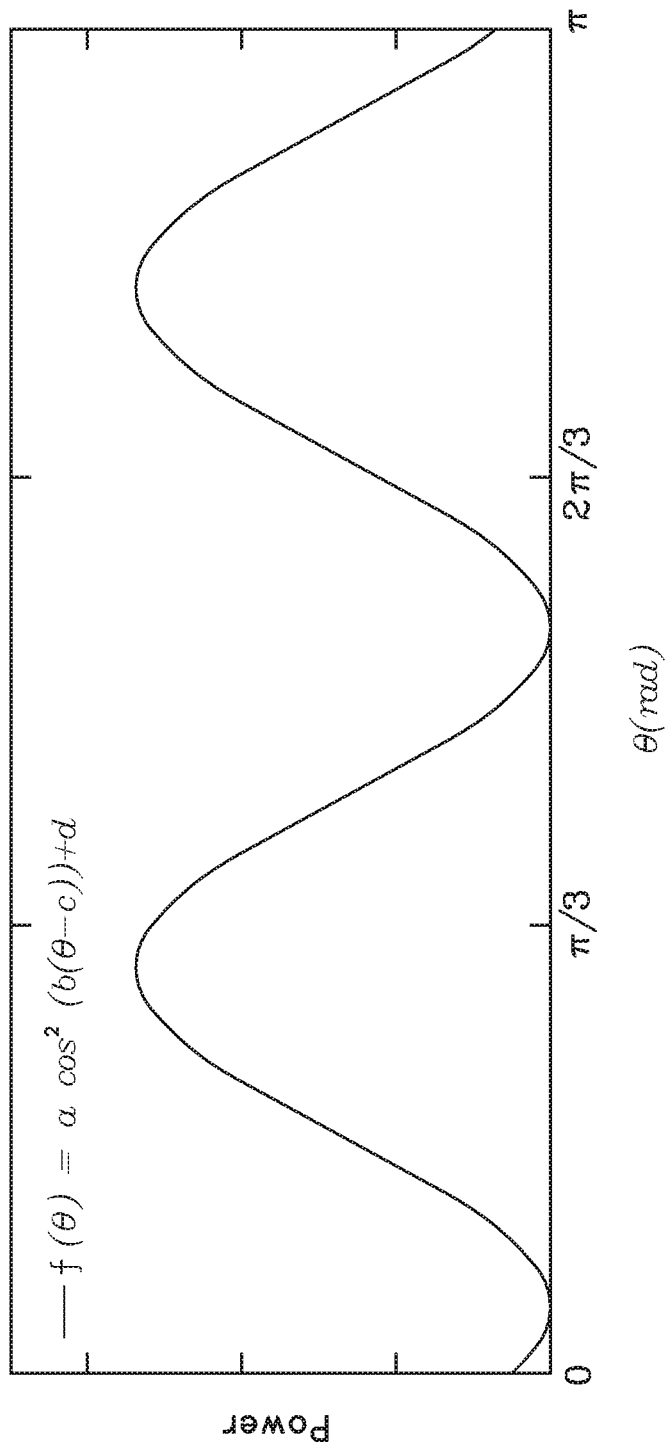
FIG. 2 is a behavior model of an optical attenuation, in accordance with an embodiment of the present invention.

Variable optical attenuator 106 provides a large number of repeatable illumination levels ranging from dark to sensor saturation without changing the intensity distribution, i.e. spatial uniformity, of the beam. The polarized beam emerging from the optical isolation component 104 is incident on the $\lambda/2$ plate of the variable optical attenuator 106. The orientation of the half-wave plate combined with the second polarizing component determines the degree of attenuation. The variable optical attenuator 106 also includes a quarter-wave plate so that polarization effects of subsequent optical components and the sensor itself are avoided. The attenuation follows a well-behaved cosine-squared curve, as seen in FIG. 2. Consequently, the illumination level can be accurately and repeatably selected by selecting the rotation angle of the half-wave plate.

By measuring the parameters a, b, c, and d (shown in FIG. 2), the cosine-square curve for the variable optical attenuator (e.g., variable optical attenuator 106) is characterized. Through parameters a and d, the characterized curve is normalized to range from zero (fully off) to one (fully on). Through the use of parameters b and c, the angles corresponding to the beginning and end of a single on-off cycle are determined. The normalized curve is then inverted over this interval of rotation angles to produce the inverse transfer function. This function maps a desired illumination output power to the necessary orientation of the $\lambda/2$ plate. The use of a piezoelectric rotation stage enables both highly repeatable and precise attenuation.

The beam sampling component 108 includes a beam diverting element, which may be either a beam splitter for simultaneous power measurement, or a mirrored shutter for periodic power measurement. This component also includes an optical power meter with calibrated photodiode so that accurate measurements of the illumination power can be captured. Focal plane integrator 110 expands the illuminating beam to fill the plane of the homogenizer, which shapes and projects the illumination through the use of structured diffusion. By adjusting the expanding optics in relation to the homogenizing filter, the illumination can be efficiently projected onto the focal plane of virtually any sensor, regardless of the structure and shape of its mounting and housing components.

In operation, focal plane illuminator 100 is adjusted to illuminate the focal plane of device under test 112, within a suitable testing environment. In some embodiments, camera settings of device under test 112 are selected for optimal characterization. Image sequences are collected, wherein data for each pixel of the sensor is collected under three conditions: (1) dark at zero integration time, (2) dark at non-zero integration time, and (3) illuminated at the same non-zero integration time. Each condition of the image sequence provides a sample mean and variance for each pixel, which in conjunction with the power measurements, is used to compute a set of five statistics for each pixel, including: conversion gain, read noise, saturation capacity, dynamic range, and dark current of each pixel. The illumination at the non-zero integration time and generalized photon transfer computations are repeated at various illumination levels ranging from just above dark to saturation of each pixel. All of the opto-mechanical and data capture and collection interfaces are integrated for common control of experiment and generalized photon transfer based characterization processing of an arbitrary sensor under test.

FIG. 3 depicts various illumination conditions of the generalized photon transfer method. The generalized photon transfer method enables the capturing of image sequences (304) that can be assumed to be statistically independent under three conditions (302) (i.e., (1) dark at zero integration time, (2) dark at non-zero integration time, and (3) illuminated as the same non-zero integration time). The capture of image sequences (304) results in six sampling statistics, i.e. the mean and variance under each of the three conditions, for each pixel of the sensor under test. The six sampling statistics (306) are used in the generalized photon transfer method to derive the conversion gain and related sensor characterization measures, including read noise, saturation capacity, dynamic range, and dark current of each pixel (308). The focal plane illuminator apparatus, such as focal plane illuminator 100 of FIG. 1, provides temporal stability and attenuation-invariant spatial uniformity across variable illumination for each pixel of the sensor under test.

The above description is that of current embodiments of the invention. Various alterations and changes can be made without departing from the spirit and broader aspects of the invention as defined in the appended claims.

What is claimed is:

1. An apparatus for individually characterizing pixels of a sensor, the apparatus comprises:
   a narrowband light source, wherein the narrowband light source generates a spatially coherent illumination beam;
   a variable optical attenuator, wherein the variable optical attenuator attenuates the spatially coherent illumination beam resulting in an attenuated beam, wherein the attenuated beam is spatially uniform and;
   a focal plane integrator, wherein the focal plane integrator expands, shapes, and homogenizes the attenuated beam to illuminate a focal plane of a sensor;
   wherein the apparatus collects an image sequence under each of the conditions selected from the list of: (1) dark at a zero integration time, (2) dark at a non-zero integration time, and (3) illuminated at the non-zero integration time for various illumination levels.

2. The apparatus of claim 1, wherein the narrowband light source is a superluminescent diode.

3. The apparatus of claim 1, wherein the narrowband light source is temporally incoherent, temporally stable, and spatially coherent under collimation.

4. The apparatus of claim 1, wherein the attenuation varies from dark to sensor saturation.

5. The apparatus of claim 1, wherein the variable optical attenuator comprises:
   a polarizing element;
   a half-wave plate; and
   a beam splitter.

6. The apparatus of claim 1, the sensor is an element of a camera and wherein the attenuated beam is applied to the focal plane of the sensor installed within the camera.

7. The apparatus of claim 6, wherein the focal plane integrator projects, homogenizes, and shapes the attenuated beam to fit an illumination requirement of the sensor installed within the camera.

8. The apparatus of claim 1, wherein the sensor is a photo-electrically based optical sensor comprising a plurality of pixels.

9. The apparatus of claim 8, wherein the sensor architecture is selected from a group consisting of: CCD, CMOS active, and CMOS passive.

10. The apparatus of claim 1, wherein the narrowband light source is temporally incoherent yet temporally stable, and wherein the narrowband light source is collimated.

11. A method for characterizing a pixel of a sensor, the method comprising:
    generating, by a focal plane illuminator, an illumination beam;
    attenuating, by the focal plane illuminator, the illumination beam, wherein the illumination beam is attenuated utilizing an optical attenuator;
    homogenizing, by the focal plane illuminator, the attenuated illumination beam;
    projecting, by the focal plane illuminator, the homogenized attenuated illumination beam wherein the shape of the projected homogenized attenuated illumination beam is changed to fill a focal plane of a sensor; and
    collecting, by the focal plane illuminator, one or more image sequences, wherein the image sequences are collected under each of the conditions selected from the list of: (1) dark at a zero integration time, (2) dark at a non-zero integration time, and (3) illuminated at the non-zero integration time for various illumination levels.

12. The method of claim 11, wherein the focal plane illuminator is adjusted to illuminate the focal plane of the sensor.

13. The method of claim 11, wherein the sensor is an optical sensor of a camera, and wherein one or more settings of the camera are selected for optimal characterization.

14. The method of claim 11, wherein one or more sensor characterization measures are computed using one or more statistics measured from the collected image sequences, wherein the one or more sensor characterization measurements are selected from the group consisting of: conversion gain, read noise, saturation capacity, dynamic range, and dark current of a pixel of the sensor.

15. The method of claim 14, wherein the sensor comprises a plurality of pixels, and wherein the one or more sensor characterization measurements are measured for each of the plurality of pixels individually and represented in a generalized photon transfer method data product as a pixel-wise data map.

* * * * *